United States Patent
Nanda et al.

(10) Patent No.: US 10,102,982 B2
(45) Date of Patent: Oct. 16, 2018

(54) ELECTROLYTES FOR SUPERCAPACITORS

(71) Applicant: UT-Battelle LLC, Oak Ridge, TN (US)

(72) Inventors: Jagjit Nanda, Knoxville, TN (US); Rose E. Ruther, Oak Ridge, TN (US); Frank M. Delnick, Maryville, TN (US); Che-Nan Sun, Williamsville, NY (US)

(73) Assignee: UT-Battelle LLC, Oak Ridge, TN (US)

(*) Notice: Subject to any disclaimer, the term of this patent is extended or adjusted under 35 U.S.C. 154(b) by 48 days.

(21) Appl. No.: 15/058,434

(22) Filed: Mar. 2, 2016

(65) Prior Publication Data

US 2016/0260551 A1    Sep. 8, 2016

Related U.S. Application Data

(60) Provisional application No. 62/127,340, filed on Mar. 3, 2015.

(51) Int. Cl.
| | |
|---|---|
| *H01G 11/60* | (2013.01) |
| *H01G 11/62* | (2013.01) |
| *H01G 11/84* | (2013.01) |
| *H01G 11/64* | (2013.01) |
| *H01G 11/04* | (2013.01) |

(52) U.S. Cl.
CPC ........... *H01G 11/60* (2013.01); *H01G 11/62* (2013.01); *H01G 11/84* (2013.01); *H01G 11/04* (2013.01); *H01G 11/64* (2013.01); *Y02E 60/13* (2013.01)

(58) Field of Classification Search
CPC ........ H01G 11/04; H01G 11/28; H01G 11/32; H01G 11/42; H01G 9/00; H01G 9/028; H01G 9/042; H01G 11/60; H01G 11/62; H01G 11/84; H01G 9/035
See application file for complete search history.

(56) References Cited

U.S. PATENT DOCUMENTS

| | | | |
|---|---|---|---|
| 8,593,788 B2 | 11/2013 | Singh | |
| 2003/0114712 A1* | 6/2003 | Tanaka | C07B 41/00 568/303 |
| 2010/0239916 A1 | 9/2010 | Bhattacharryya et al. | |
| 2011/0075324 A1* | 3/2011 | Singh | H01G 11/56 361/503 |

(Continued)

FOREIGN PATENT DOCUMENTS

| | | |
|---|---|---|
| CN | 101840784 A | 9/2010 |
| CN | 103198928 A | 7/2013 |

OTHER PUBLICATIONS

9th International Symposium on Polymer Electrolytes, Extended Abstracts, by Polymer Ionics Research Group PIRG at Chemical Faculty, Warsaw University of Technology.

(Continued)

*Primary Examiner* — Nguyen Ha
(74) *Attorney, Agent, or Firm* — Warner Norcross + Judd LLP

(57) ABSTRACT

A supercapacitor and a related electrolyte composition suitable for use in a supercapacitor are provided. An electrolyte composition can include a conductive sodium salt component comprising NaTFSI and a non-aqueous solvent component comprising dimethoxy ethane (DME). The conductive sodium salt component and the non-aqueous solvent component can be present at a molar ratio of NaTFSI:DME of 1:1 to 1:3, inclusive.

19 Claims, 15 Drawing Sheets

(56) References Cited

U.S. PATENT DOCUMENTS

| | | | |
|---|---|---|---|
| 2011/0080689 | A1 | 4/2011 | Bielawski et al. |
| 2011/0212363 | A1 | 9/2011 | Yamazaki et al. |
| 2012/0064388 | A1 | 3/2012 | Whitacre et al. |
| 2013/0302702 | A1 | 11/2013 | Matsumoto |
| 2014/0042988 | A1* | 2/2014 | Kuttipillai .............. H01G 11/30 320/167 |
| 2014/0308544 | A1 | 10/2014 | Wessells et al. |
| 2014/0363746 | A1 | 12/2014 | He et al. |
| 2015/0064574 | A1* | 3/2015 | He .................... H01M 10/0568 429/300 |
| 2016/0071658 | A1* | 3/2016 | Azais .................... H01G 11/04 361/502 |
| 2016/0072151 | A1* | 3/2016 | Zhang ............... H01M 10/0568 429/331 |

OTHER PUBLICATIONS

Solid State Ionics Diffusion & Reactions, Elsevier vol. 181, Issues 8-10, Mar. 29, 2010.

Phase Diagrams and Solvate Structures of Binary Mixtures of Glymes and Na Salts, Toshihiko Mandai et al, The Journal of Physical Chemistry, 2013, 117, pp. 15072-15085.

Review-Superconcentrated Electrolytes for Lithium Batteries, Yuki Yamada et al, Journal of the Electrochemical Society, 162 (14) pp. A2406-A2423 (2015).

High energy density sodium-ion capacitors throughco-intercalation mechanism in diglyme-based electrolyte system, Pengxian Han et al, Journal of Power Sources 297 (2015) pp. 457-463.

Physicochemical properties of pentaglyme-sodium bis(trifluoromethanesulfonyl)amide solvate ionic liquid, Shoshi Terada et al, Royal Society of Chemistry, Phys. Chem. Chem. Phys., 2014, 16, pp. 11737-11746.

A superconcentrated ether electrolyte for fast-charging Li-ion batteries, Yuki Yamada et al, Royal Society of Chemistry, Chem. Commun., 2013, 49, pp. 11194-11196.

Criteria for solvate ionic liquids, Toshihiko Mandai et al, Royal Society of Chemistry, Phys. Chem. Chem. Phys., 2014, 16, pp. 8761-8772.

Chelate Effects in Glyme/Lithium Bis(trifluoromethanesulfonyl)amide Solvate Ionic Liquids, Part 2: Importance of Solvate-Structure Stability for Electrolytes of Lithium Batteries, Ce Zhang et al, The Journal of Physical Chemistry, 2014, 118, pp. 17362-17373.

Chelate Effects in Glyme/Lithium Bis(trifluoromethanesulfonyl)amide Solvate Ionic Liquids. I. Stability of Solvate Cations and Correlation with Electrolyte Properties, Ce Zhang et al, The Journal of Physical Chemistry, 2014, 118, pp. 5144-5153.

International Search Report and Written Opinion for International Application No. PCT/US2016/020359, dated May 19, 2016.

* cited by examiner

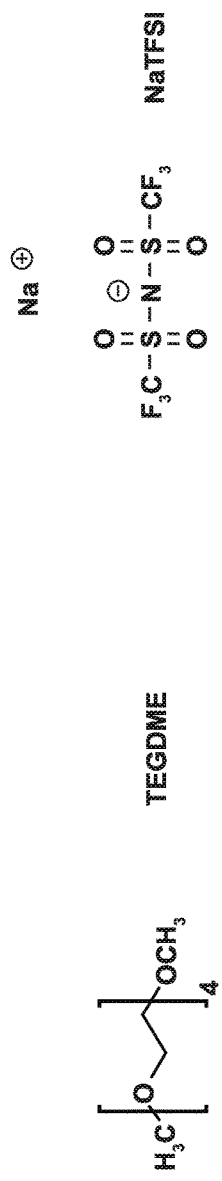
FIG. 7A  TEGDME
FIG. 7B  DME
FIG. 7C  NaOTf
FIG. 7D  NaPF$_6$
FIG. 7E  NaTFSI

ELECTROLYTES FOR SUPERCAPACITORS

This invention was made with government support under Contract No. DE-AC05-00OR22725 awarded by the U.S. Department of Energy. The government has certain rights in the invention.

BACKGROUND OF THE INVENTION

The present invention relates to electrolyte compositions for supercapacitors, also referred to interchangeably as ultracapacitors or electric double-layer capacitors (EDLC).

Supercapacitors store ionic charge electrostatically at the interface of high surface area electrodes, such as carbon electrodes, in a liquid electrolyte composition. Efforts to increase the energy density of supercapacitors have focused mainly on developing higher surface area electrodes and controlling electrode pore size. Energy density of supercapacitors can also be increased through faradaic mechanisms commonly known as pseudocapacitance, which arises from the introduction of redox active groups through functionalization of the carbon electrode surface or the incorporation of metal oxides.

Despite significant improvements in electrode materials design, most non-aqueous electrochemical capacitors use the same electrolyte compositions: either a mixture of tetraethylammonium tetrafluoroborate ($TEABF_4$) in acetonitrile (MeCN) or TEABF4 in propylene carbonate (PC). These electrolyte compositions have a high specific conductivity that minimizes resistive losses and enables capacitors to operate at high power. However, these electrolyte compositions typically exhibit a practical voltage window around 2.7 volts, beyond which the capacitor lifetime is significantly reduced. Because the energy stored in a capacitor increases quadratically with voltage, extending the electrochemical window of the electrolyte composition could significantly improve the energy density of the capacitor.

Accordingly, there remains a continued need for an electrolyte composition that can extend the operating voltage window of a supercapacitor.

SUMMARY OF THE INVENTION

A supercapacitor and an electrolyte composition for use in a supercapacitor are described herein. The supercapacitor includes a negative electrode having a current collector, a positive electrode having a current collector, an ion-permeable separator disposed between the negative and positive electrodes, and an electrolyte composition disposed between the negative and positive electrodes. The electrolyte composition includes a conductive sodium salt component including sodium bis(trifluoromethylsulfonyl)imide (NaTFSI) and a non-aqueous solvent component including dimethoxy ethane (DME). The non-aqueous solvent component and the conductive sodium salt component are present at a molar ratio of NaTFSI:DME within a range of 1:1 to 1:3, inclusive, and more particularly 1:2.

In one embodiment, a method of forming a supercapacitor includes providing a negative electrode having a current collector, providing a positive electrode having a current collector, providing an ion-permeable separator in a space between the negative and positive electrodes, and providing an electrolyte composition in the space between the negative and positive electrodes. The electrolyte composition includes a conductive sodium salt component including sodium bis(trifluoromethylsulfonyl)imide (NaTFSI) and a non-aqueous solvent component including dimethoxy ethane (DME). The non-aqueous solvent component and the conductive sodium salt component can be combined to form a solvated ionic liquid in the space between the negative and positive electrodes.

In another embodiment, the electrolyte composition further includes a corrosion inhibitor with tetrabutylammonium perchlorate ($TBAClO_4$), tetrabutylammonium hexafluorophosphate ($TBAPF_6$), or combinations thereof.

In still another embodiment, the electrolyte composition has an electrochemical potential window of at least 3.25 volts, and still further an electrochemical potential window of at least 3.25 volts with 99% coulombic efficiency after 10 cycles. In even another embodiment, the salt component and the non-aqueous solvent component are mixed at a molar ratio that forms a solvated ionic liquid.

These and other features and advantages of the present invention will become apparent from the following description of the invention, when viewed in accordance with the accompanying drawings and appended claims.

BRIEF DESCRIPTION OF THE DRAWINGS

FIGS. 7A-E illustrate the chemical structures of exemplary salts and solvents in accordance with one embodiment of the invention.

DETAILED DESCRIPTION OF THE CURRENT EMBODIMENTS

The embodiments of the invention as contemplated and disclosed herein include electrolyte compositions for use in forming a supercapacitor. As set forth below, an electrolyte composition can include a non-aqueous solvent component and a conductive sodium salt component combined in a stoichiometric ratio to form a solvated ionic liquid. An exemplary electrolyte composition can include sodium bis (trifluoromethylsulfonyl)imide (NaTFSI) and dimethoxyethane (DME) combined in a molar ratio of NaTFSI:DME in a range of 1:1 to 1:3, inclusive, optionally 1:2, which can exhibit an electrochemical window greater than 3.25 volts (V).

I. NaTFSI and DME

Figure 1:
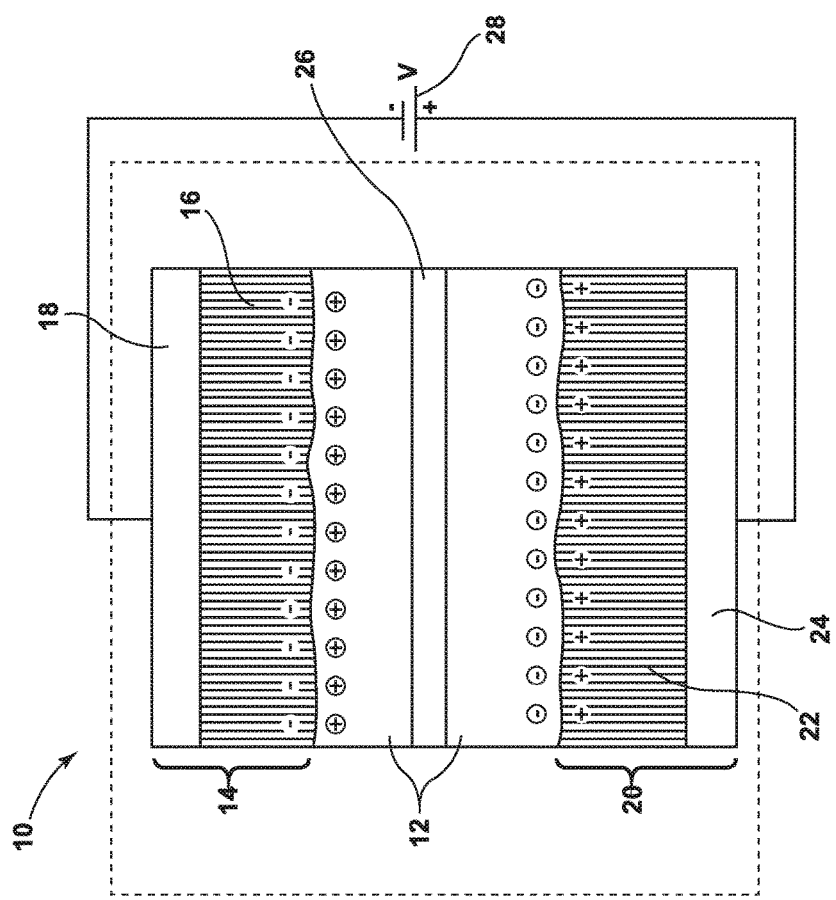
FIG. 1 illustrates a schematic representation of a supercapacitor in accordance with a current embodiment of the invention.

FIG. 1 is a schematic illustration of a supercapacitor 10 with an electrolyte composition 12 in accordance with a current embodiment. The supercapacitor 10 can include a negative electrode 14 having an energy storage component 16 and a current collector 18. Similarly, a positive electrode 20 can include an energy storage component 22 and a current collector 24. An ion-permeable separator 26 can be disposed between the negative and positive electrodes 14 and 20, with the electrolyte composition 12 filling void spaces in and between the negative and positive electrodes 14 and 20 and the separator 26. The negative and positive electrodes 14 and 20 can be connected with a voltage supply source 28 to charge the supercapacitor 10.

The electrolyte composition 12 can include a non-aqueous solvent component and a conductive sodium salt component combined in a stoichiometric ratio to form a solvated ionic liquid. Solvated ionic liquids form when a stable complex of salt and organic solvent is formed such that little to no free solvent remains. Solvated ionic liquids exhibit properties that are different than other mixtures of the same salt in an organic solvent at different stoichiometric ratios. The electrolyte composition 12 can also include additional materials, such as corrosion inhibiting salts, to facilitate increasing the electrochemical voltage window of the electrolyte composition 12.

In one embodiment, the electrolyte composition 12 includes NaTFSI and DME combined in a molar ratio in the range of 1:1 to 1:3, inclusive, optionally 1:2, of NaTFSI:DME. A composition including a molar ratio of 1:2 of NaTFSI:DME forming a solvate ionic liquid is referred to herein as $(DME)_2NaTFSI$. FIGS. 2-5 compare the characteristics of exemplary $(DME)_2NaTFSI$ electrolyte compositions which include a solvate ionic liquid against comparative electrolyte compositions which do not include a solvate ionic liquid. Table 1 below lists the example and comparative electrolyte compositions evaluated in FIGS. 2-5.

TABLE 1

Example and Comparative Electrolyte Compositions

| Electrolyte Composition | Salt | Solvent | Relative Amount[1] | Additives[1] |
|---|---|---|---|---|
| $(DME)_2NaTFSI$ Example 1 | NaTFSI | DME | NaTFSI:DME of 1:2 | |
| $(DME)_2NaTFSI$ Example 2 | NaTFSI | DME | NaTFSI:DME of 1:2 | 2 w/o TBAClO$_4$ |
| $(DME)_2NaTFSI$ Example 3 | NaTFSI | DME | NaTFSI:DME of 1:2 | 1 w/o TBAPF$_6$ |
| Comparative Example 1 | NaTFSI | DME | 10 w/o excess DME[2] | |
| Comparative Example 2 | NaTFSI | DME | 10 w/o excess NaTFSI[2] | |
| Comparative Example 3 | NaPF$_6$ | DME | 1 m NaPF$_6$ in DME | |
| Comparative Example 4 | TEABF$_4$ | MeCN | 1 m TEABF$_4$ in MeCN | |

[1]The unit "w/o" is used herein to refer to an amount of a component as a percent of the total mass of the material. The unit "m" is used herein to refer to molality (moles of solute per kilogram of solvent).
[2]Excess with respect to (DME)2NaTFSI.

Figure 2:
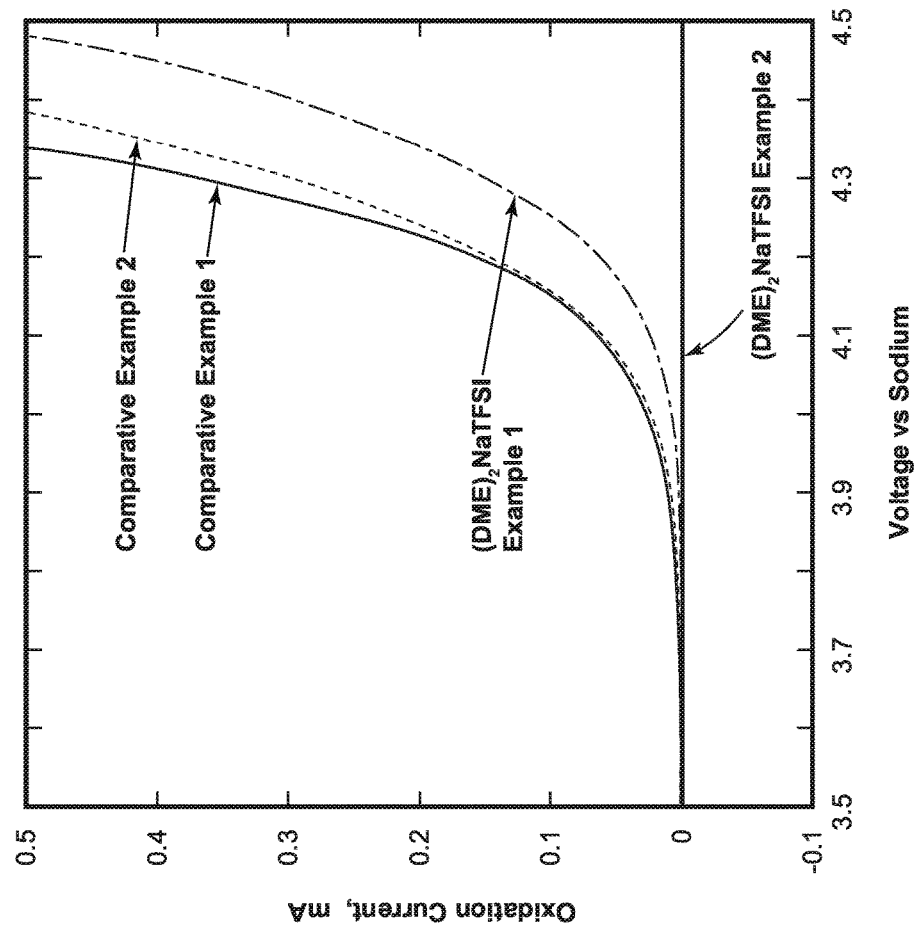
FIG. 2 illustrates aluminum oxidation current scans of exemplary and comparative electrolyte compositions in accordance with an embodiment of the invention.

FIG. 2 compares the oxidation current in electrochemical cells that include electrolyte compositions "$(DME)_2NaTFSI$ Examples 1 and 2" against "Comparative Examples 1 and 2." Each electrolyte composition was evaluated in an electrochemical cell having an aluminum electrode (½×½ inches), a Whatman DBS30 glass mat separator (⅝×⅝ inches, available from Whatman Paper Ltd., Maidstone, England), and a sodium metal foil electrode (½×½ inches, pressed onto a copper foil current collector). The electrodes and separator were sealed in a ShieldPak pouch cell (Shield Pack, Los Angeles, U.S.A.) with ½ milliliter of one of the electrolyte compositions. Each cell was potentiodynamically cycled five times between 2.5 and 4.5 V at a potential scan rate of 20 mV/sec. The aluminum oxidation current measured during the negative scan on the fifth cycle was recorded and is illustrated in FIG. 2.

As can be seen in FIG. 2, the electrochemical cells using Comparative Examples 1 and 2 as the electrolyte compositions, in which there is an excess of DME or NaTFSI, respectively, exhibit a higher aluminum oxidation current than the cells that include a 1:2 molar ratio of NaTFSI:DME, $(DME)_2NaTFSI$ Examples 1 and 2. FIG. 2 further illustrates that adding a corrosion inhibitor, such as TBAClO$_4$, to the $(DME)_2NaTFSI$ solvated ionic liquid electrolyte, suppresses the oxidation of the aluminum compared to $(DME)_2NaTFSI$ Example 1, which does not include a corrosion inhibitor. Inhibiting corrosion of aluminum in the presence of $(DME)_2NaTFSI$ can facilitate extending the electrochemical voltage window of the cell, particularly when the cathode is charged to greater than 4 V vs. a sodium electrode. Non-limiting examples of corrosion inhibitors that can be used in the electrolyte composition include other sources of perchlorate anions, such as sodium perchlorate (NaClO$_4$).

Figure 3:
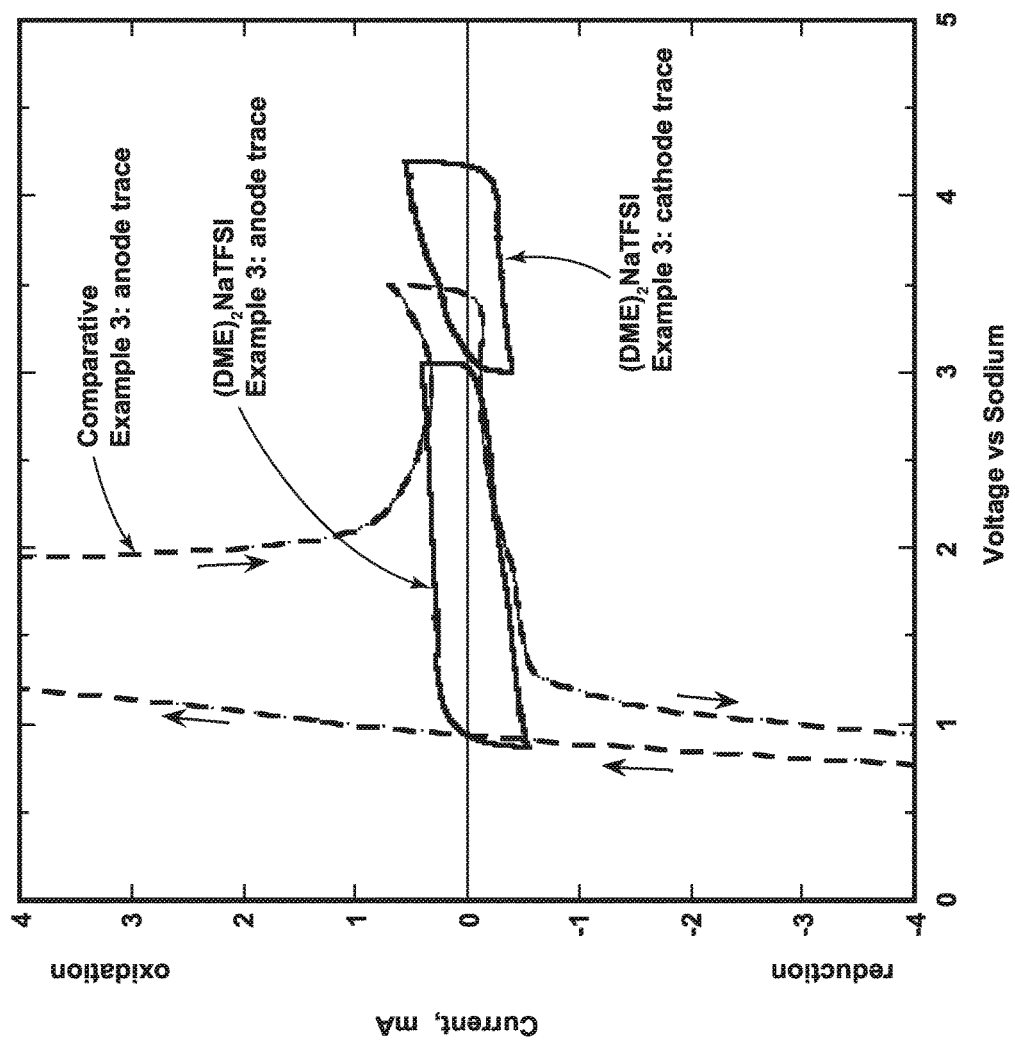
FIG. 3 illustrates a cyclic voltammetry trace for exemplary and comparative electrolyte compositions in accordance with an embodiment of the invention.

FIG. 3 illustrates cyclic voltammetry (CV) traces for electrochemical cells using either the $(DME)_2NaTFSI$ Example 3 or the Comparative Example 3 electrolyte. The test cells were EL-Cells (EL-CELL GmbH, Hamburg, Germany) assembled with porous carbon electrodes for the cathode and anode (Sigracet GDL 10AA, available from SGL Group, SGL Carbon GmbH, Meitingen, Germany). The anode in each cell was potentiodynamically cycled versus a sodium metal reference electrode five times at 20 mV/sec. The reduction-oxidation currents were recorded on the fifth cycle and are illustrated in FIG. 3.

Still referring to FIG. 3, Comparative Example 3 includes NaPF$_6$ combined with DME, but does not include a solvated ionic liquid. The high reduction and oxidation currents exhibited by the cell using Comparative Example 3 as the electrolyte can be indicative of sodium cation and DME co-intercalation into and de-intercalation out of the carbon anode electrode. In contrast, when $(DME)_2NaTFSI$ Example 3 is used in the cell, which includes a solvated ionic liquid, the high reduction and oxidation currents indicative of the co-intercalation and de-intercalation reactions with the carbon anode electrode are not exhibited.

FIG. 3 also illustrates the charging and discharging currents for the cathode in the cell using the $(DME)_2NaTFSI$ Example 3 electrolyte. No reduction-oxidation processes were observed at the cathode up to a voltage of about 4.2 V vs. the sodium reference electrode in the presence of $(DME)_2$ NaTFSI Example 3, indicating that the electrolyte composition itself has a voltage window greater than 4 V. FIG. 3 demonstrates that the $(DME)_2$NaTFSI Example 3 electrolyte, which includes a solvate ionic liquid, can enable the carbon electrodes of the supercapacitor cell to cycle reversibly over a voltage range of at least about 3.25 V (voltage of the anode electrode with respect to the cathode electrode). In contrast, severe corrosion reactions occur on the cathode electrode of the cell when the voltage exceeds about 3.5 V vs. the sodium reference electrode in the presence of the Comparative Example 3 electrolyte.

Figure 4:
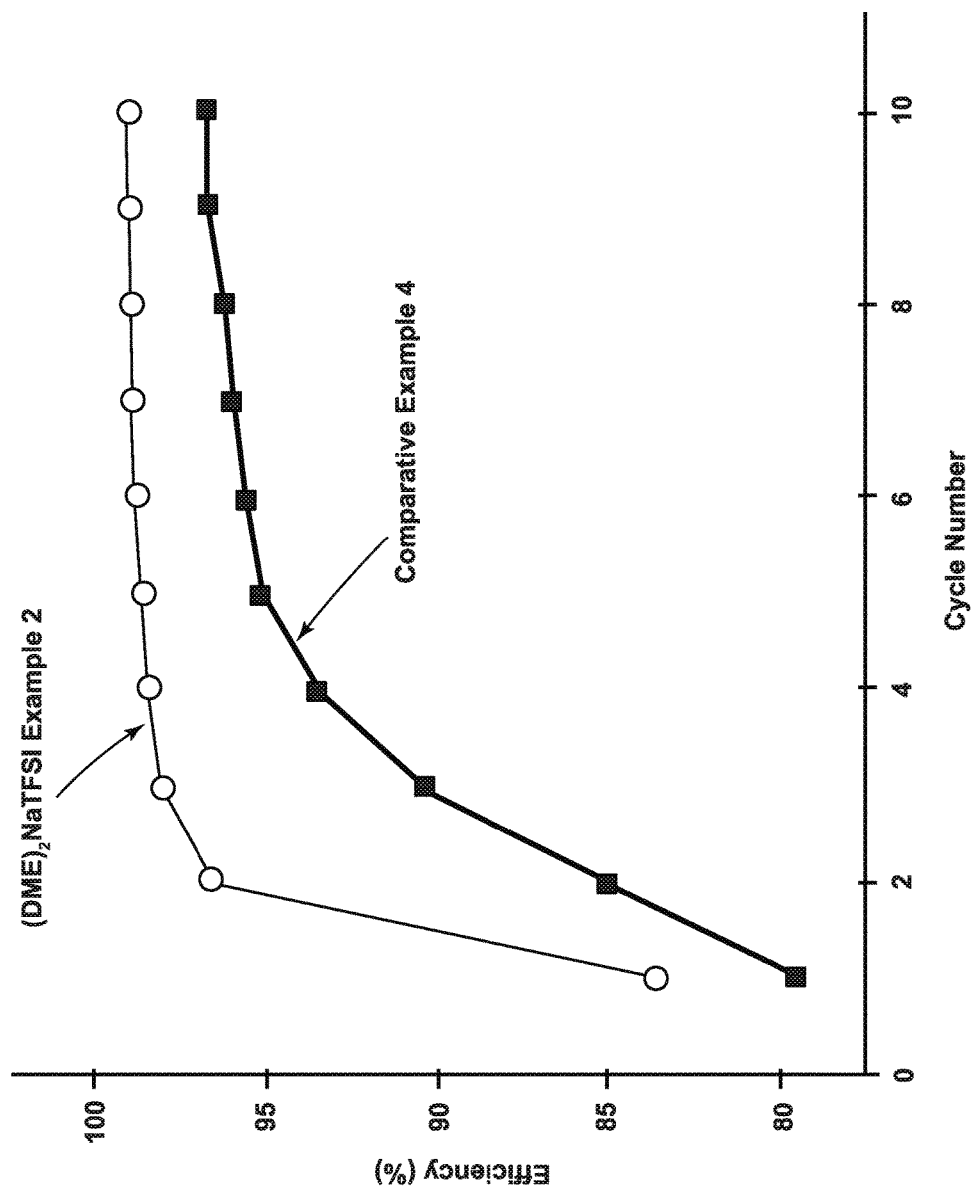
FIG. 4 illustrates a comparison of the cycling efficiency of an electrolytic cell including an exemplary and comparative electrolyte composition in accordance with an embodiment of the invention.
Figure 5:
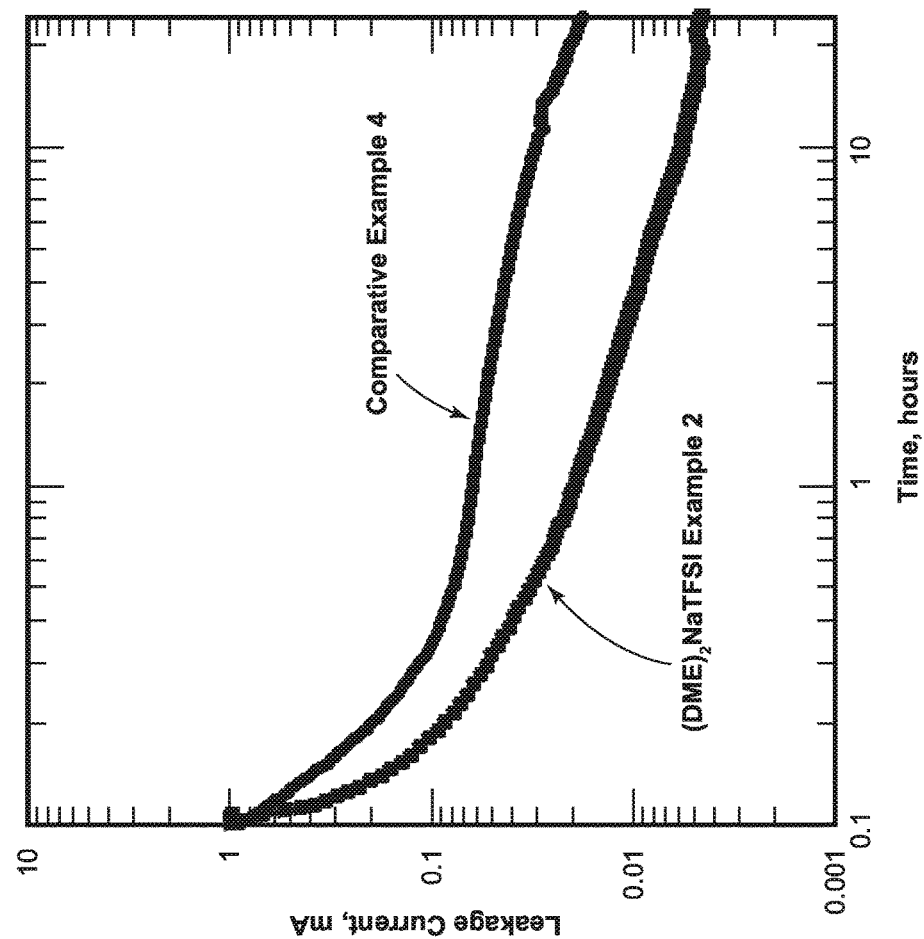
FIG. 5 illustrates leakage current for an electrolytic cell including exemplary and comparative electrolyte compositions in accordance with an embodiment of the invention.

FIGS. 4 and 5 compare the coulombic efficiency and the leakage current, respectively, of electrochemical cells which include either the $(DME)_2$NaTFSI Example 2 electrolyte or Comparative Example 4. Comparative Example 4 includes tetraethylammonium tetrafluoroborate ($TEABF_4$) in acetonitrile (MeCN), which is a conventional electrolyte used in supercapacitors.

The $(DME)_2$NaTFSI Example 2 electrolyte was evaluated in a ShieldPak pouch cell including high surface area carbon anode and cathode electrodes separated by a Whatman DBS30 glass mat separator (Whatman Paper Ltd., Maidstone, England). The high surface area carbon electrodes were fabricated by spray coating an aqueous slurry of BP2000 carbon (Cabot Corp., Billerica, Mass., U.S.A.) and sodium carboxymethylcellulose (molecular weight 700,000, Sigma-Aldrich, St. Louis, Mo., USA) onto aluminum foil current collectors (z-flo 2650 coated aluminum foil, available from Coveris Advanced Coatings, Matthews, N.C., U.S.A.). The coatings were dried at 120° C. and maintained in an inert atmosphere glove box prior to cell assembly. The dry electrodes consisted of 90 w/o BP2000 carbon and 10 w/o sodium carboxymethylcellulose.

For comparison, Comparative Example 4 was evaluated in a similar ShieldPak pouch cell except that the cell used conventional Teflon bonded BP2000 electrodes prepared from an aqueous slurry including Teflon (polytetrafluoroethylene preparation 60 w/o dispersion in water, available from Sigma-Aldrich, St. Louis, Mo., U.S.A.). When dried, these electrodes consisted of 93 w/o BP2000 carbon and 7 w/o Teflon.

The $(DME)_2$NaTFSI Example 2 electrolyte cell and the Comparative Example 4 cell were each cycled 10 times to 3.25 V and 2.0 V, respectively. FIG. 4 illustrates the round-trip coulombic efficiency for each cell during the 10 cycles. As can be seen in FIG. 4, the cell with the $(DME)_2$NaTFSI Example 2 electrolyte exhibits greater coulombic efficiency than the cell utilizing the traditional electrolyte of Comparative Example 4, which does not include a solvate ionic liquid.

Referring now to FIG. 5, after cycling, each cell was potentiostatically held at its respective charge potential, 3.25 V for the $(DME)_2$NaTFSI Example 2 electrolyte cell and 2.0 V for Comparative Example 4, and the leakage current was measured for 24 hours. As illustrated in FIG. 5, the leakage current for the $(DME)_2$NaTFSI Example 2 electrolyte cell, which includes a solvated ionic liquid, is lower than the cell that includes the conventional electrolyte of Comparative Example 4, even when charged to a higher potential.

Figure 6:
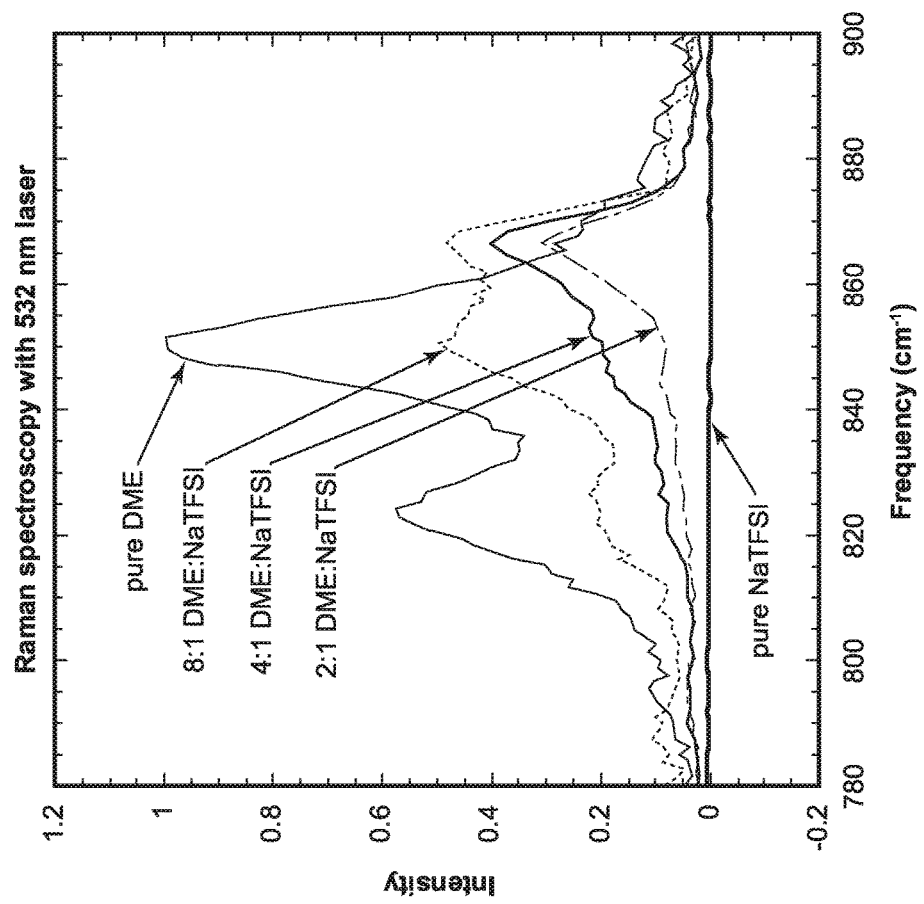
FIG. 6 is a graph that illustrates a portion of a Raman spectroscopy scan for electrolyte compositions in accordance with an embodiment of the present invention.

Referring now to FIG. 6, different concentrations of mixtures of NaTFSI and DME were evaluated using Raman spectroscopy. The modes at ~820 and 850 $cm^{-1}$ correspond to $rCH_2$ and $\nu$C-O of free DME. The mode at ~870 $cm^{-1}$ is attributed to a cation-oxygen breathing mode of DME coordinated with the salt. As can be seen in FIG. 6, as the ratio of NaTFSI:DME approaches 1:2, free DME is almost entirely reduced and replaced by the coordinated salt-DME solvated ion complex. It is understood that a small fraction of sodium ions and DME molecules may remain uncoordinated, consistent with conventional thermodynamics of the coordination reactions.

While the exemplary electrolyte compositions described herein were evaluated at a NaTFSI:DME molar ratio of 1:2, it is understood that the exact molar ratio can vary between about 1:1 and 1:3 based on the design and specifications of the supercapacitor. For example, additional components added to the electrolyte compositions, such as corrosion inhibitors, may alter the molar ratio of NaTFSI:DME which forms a solvated ionic liquid to be slightly less or slightly greater than 1:2. In another example, the molar ratio of NaTFSI:DME can be adjusted depending on the extent to which the co-intercalation and de-intercalation reactions with the electrodes are to be suppressed.

To reiterate, the above contemplated and disclosed embodiments of the invention include an electrolyte composition that can include a non-aqueous solvent component and a conductive sodium salt component combined in a stoichiometric ratio to form a solvated ionic liquid. As discussed above, NaTFSI and DME can be combined to form a solvated ionic liquid which can exhibit an electrochemical window greater than 3.25 V and is suitable for use in supercapacitors. The NaTFSI and DME-based electrolyte composition can be used to form a supercapacitor that holds its charge while also having an increased electrochemical voltage window compared to supercapacitors that use more traditional electrolyte compositions. Because the energy stored in a capacitor increases quadratically with voltage, extending the voltage window using the NaTFSI and DME-based electrolyte compositions described herein can facilitate increasing the energy density of supercapacitors.

As discussed above, the use of a NaTFSI and DME solvate ionic liquid as an electrolyte composition can be used to suppress the intercalation and de-intercalation reactions that can occur with carbon-based electrodes when non-aqueous solvents such as DME are used. Suppressing these intercalation and de-intercalation reactions can facilitate increasing the electrochemical voltage window for supercapacitors having DME-based electrolyte compositions, particularly those supercapacitors having carbon-based electrodes. Alkali cations are typically co-intercalated with glyme solvents (such as DME) into some carbon electrodes to form ternary compounds. When formed reversibly, these compounds can contribute pseudocapacitave behavior to the negative carbon electrode in the supercapacitor and improve the energy density of the supercapacitor. However, the co-intercalation of sodium cations (with solvent) can also increase irreversible losses in the electrode and reduce the lifetime and efficiency of the supercapacitor. By inhibiting these co-intercalation reactions the solvated ionic electrolyte can facilitate increasing the coulombic efficiency and cycle life of the supercapacitor compared to electrolyte compositions which utilize non-aqueous solvents, but do not form solvate ionic liquids.

In addition, DME solvated ionic liquids do not decompose at the same voltage as simple mixtures of a salt and DME, which can also facilitate increasing the voltage window of an electrolyte composition which forms a solvated ionic liquid.

Additional components, such as corrosion inhibitors, can also be added to the electrolyte compositions to facilitate increasing the voltage window of the electrolyte composition. For example, NaTFSI in particular can corrode the aluminum typically used as current collectors in supercapacitors and thus the addition of a corrosion inhibitor to a NaTFSI-based electrolyte composition can reduce corrosion of the current collector in these systems. Corrosion inhibitors such as sodium perchlorate ($NaClO_4$) or tetrabutylammonium perchlorate ($TBAClO_4$) can inhibit the corrosion of aluminum current collectors which are typically used in supercapacitors and thereby facilitate extending the voltage window of the NaTFSI and DME-based solvated ionic liquid electrolyte.

In addition, the salts and solvents described herein are commercially available, which facilitates the use of these materials to form electrolyte compositions in a cost-effective and scalable manner.

II. TEGDME and DME

In addition to the forgoing, the electrolyte composition can include TEGDME and/or DME. FIGS. 7A-E illustrate the chemical structure of the exemplary solvents (A) TEGDME and (B) DME used in the non-aqueous solvent component and the exemplary sodium salts used in the conductive sodium salt component of the electrolyte compositions according to additional embodiments of the invention. In these additional embodiments, an electrolyte composition can be formed in which the conductive sodium salt component and the non-aqueous solvent component do not combine to form a solvate ionic liquid. The exemplary sodium salts illustrated in FIG. 7 include (C) sodium triflate (NaOTf), (D) sodium hexafluorophosphate ($NaPF_6$), and (E) sodium bis(trifluoromethylsulfonyl)imide (NaTFSI). Table 2 below lists several exemplary electrolyte compositions A-E evaluated for use as a supercapacitor electrolyte composition.

TABLE 2

Electrolyte compositions

| Electrolyte Composition | Conductive Sodium Salt Component* | Non-Aqueous Solvent Component |
|---|---|---|
| A | NaOTf | TEGDME |
| B | $NaPF_6$ | TEGDME |
| C | $NaPF_6$ | DME |
| D | NaOTf | TEGDME/DME (1:1) |
| E | $NaPF_6$ | TEGDME/DME (1:1) |

*Electrolyte compositions A-E were prepared at a 1 molal (m) concentration of the sodium salt and stored over a sodium metal.

The electrolyte compositions A-E were evaluated in a high purity argon-filled glove box. NaOTf was dried overnight at 120° C. under vacuum and $NaPF_6$ was dried overnight at room temperature under vacuum and further purified by electrolysis between sodium electrodes. TEGDME and DME were both dried over a molecular sieve for several days. Three different electrochemical cell set-ups were used to evaluate the electrolyte compositions A-E as follows according to known-methods.

T-Cell: Three electrode-cells were constructed using polypropylene tees. A freshly polished glassy carbon disc was used as the working electrode. Sodium metal was used as the counter and reference electrodes.

Pouch Cell: Carbon electrodes were prepared by slurry coating a suspension of 94 wt. % carbon black (Ketjenblack) and 6 wt. % PVDF in n-methyl-2-pyrrolidone (NMP) onto de-passivated aluminum foil. The electrodes were dried overnight at 100° C. under vacuum. The pouch cells were sealed with two identical carbon electrodes separated by a Whatman DBS30 glass mat separator (Whatman Paper Ltd., Maidstone, England) and 1 mL of electrolyte composition.

Button Cell: A three-electrode button cell, commercially available from EL-Cell GmbH, was set up using gold foil as the working electrode and sodium metal as the reference and counter electrodes. A Whatman DBS30 glass mat separator was used as the cell separator.

Electrochemical Testing: Cyclic voltammetry (CV), electrochemical impedance spectroscopy (EIS), and charge-discharge cycling were measured using a Bio-Logic SP240 Potentiostat/Galvanostat. CVs were acquired at a scan rate of 20 mV/s, unless otherwise specified. For EIS, a 10 mV sinusoidal perturbation was superimposed onto the steady state polarization potentials. Cycling tests were conducted at 3 $mA/cm^2$. All current and capacitance measurements were normalized to the geometric surface area of the working electrode. All potentials are referenced to the Na/Na+ reduction-oxidation potential (approximately −2.71 vs standard hydrogen electrode (SHE)).

Figure 8A:
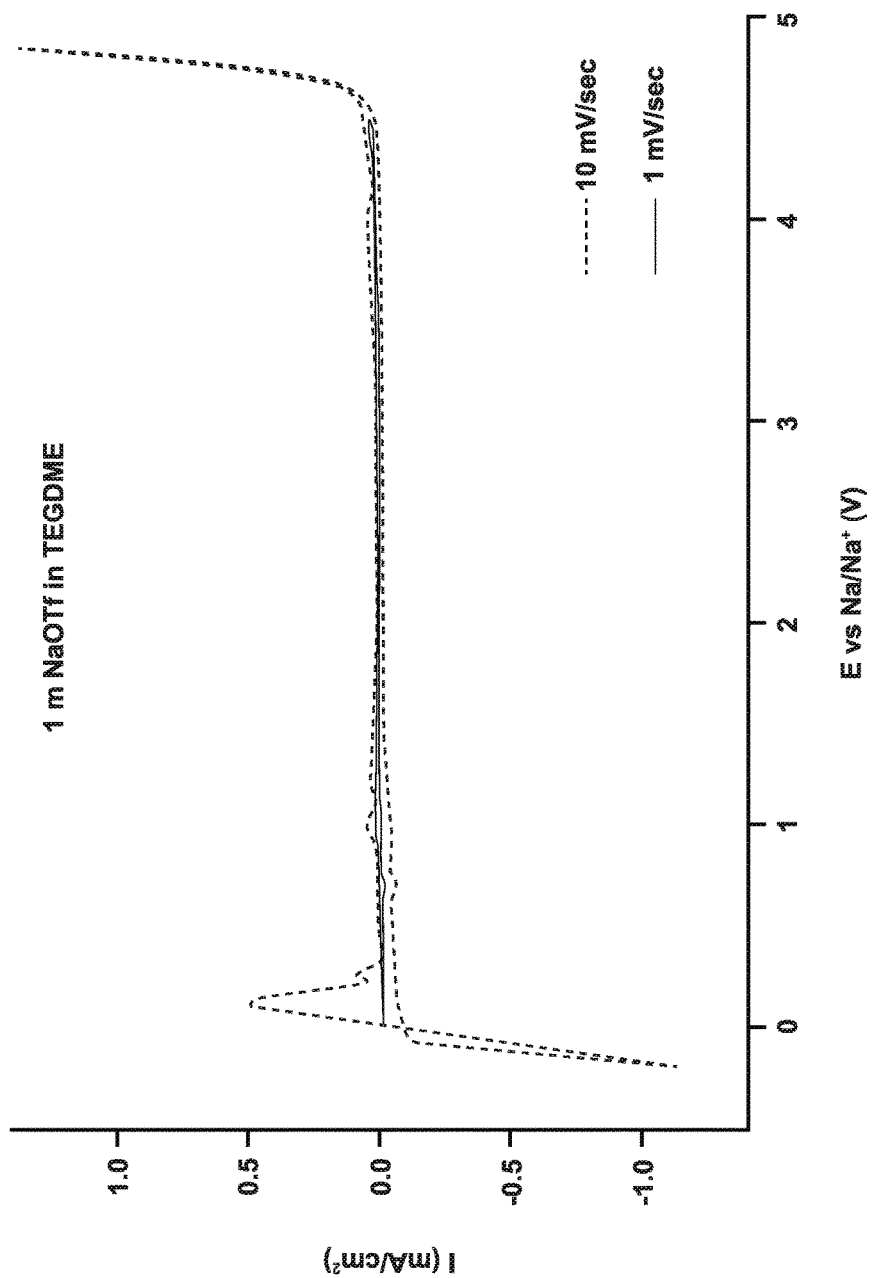
FIGS. 8A-B illustrate a cyclic voltammetry scan and a specific capacitance vs. potential scan, respectively, for an electrolyte composition in accordance with an embodiment of the invention.
Figure 8B:
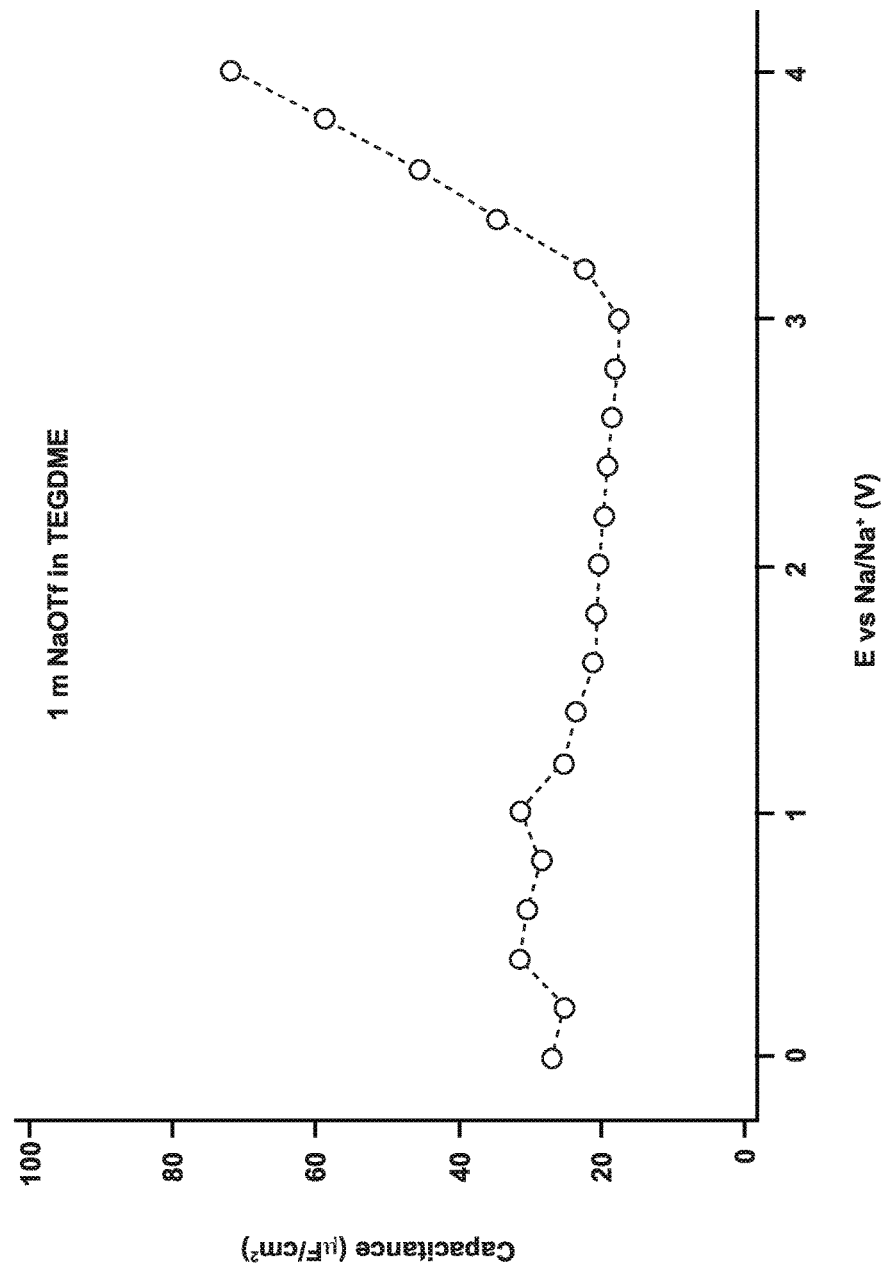
Figure 9A:
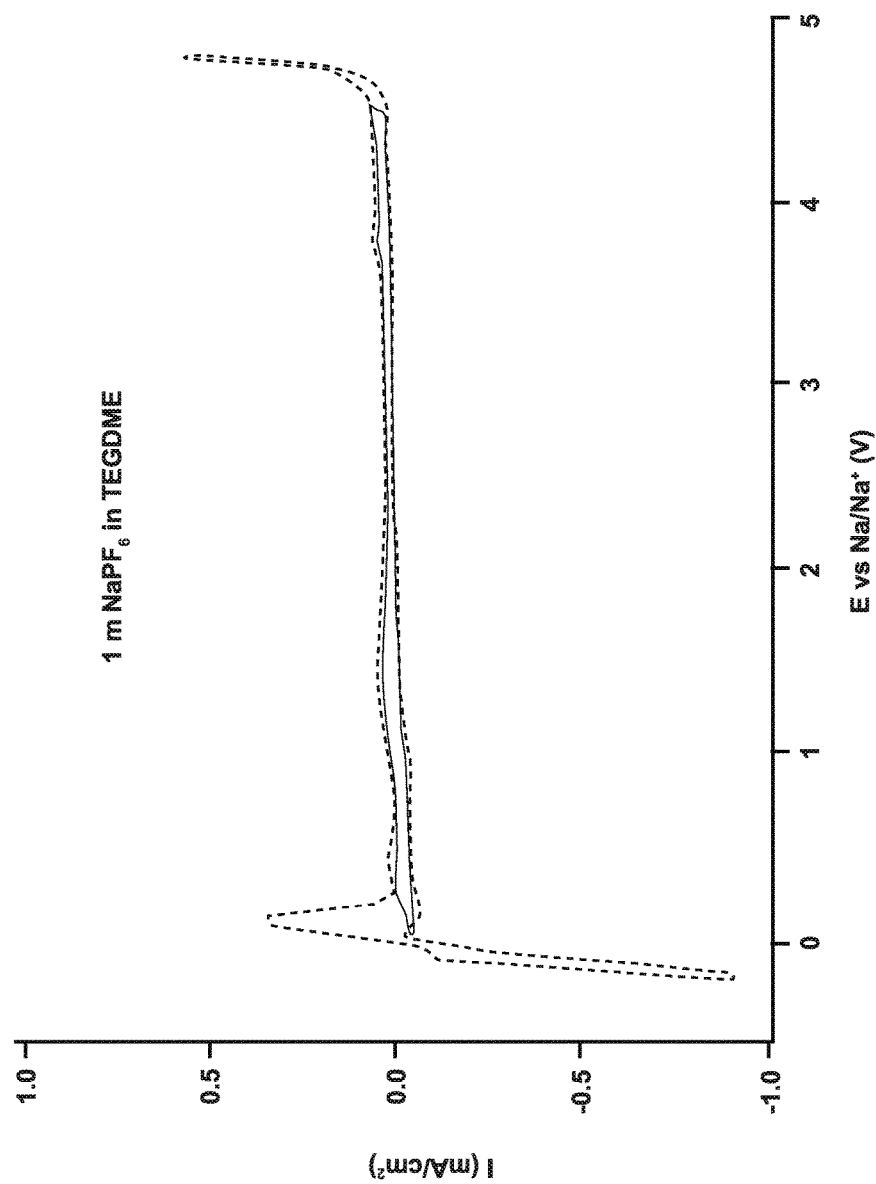
FIGS. 9A-B illustrate a cyclic voltammetry scan and a specific capacitance vs. potential scan, respectively, for an electrolyte composition in accordance with an embodiment of the invention.

FIGS. 8A-B and 9A-B illustrate the characteristics of electrolyte compositions A and B in an electrochemical T-cell having a glassy carbon working electrode as described above. The dashed lines in FIGS. 8A and 9A illustrate CV scans taken between −0.2 and 4.8 V vs Na/Na+ at 10 mV/sec and the solid lines illustrate CV scans acquired between 4.5 and 0 V vs Na/Na+ at 1 mV/sec for electrolyte compositions A and B, respectively. Electrolyte oxidation results in a large increase in the cell current at potentials above 4.5 V and sodium reduction occurs at potentials below 0 V. The results of FIGS. 8A and 9A demonstrate that electrolyte compositions A and B are stable with respect to reduction and oxidation over approximately a 4.5 V electrochemical voltage window.

Figure 9B:
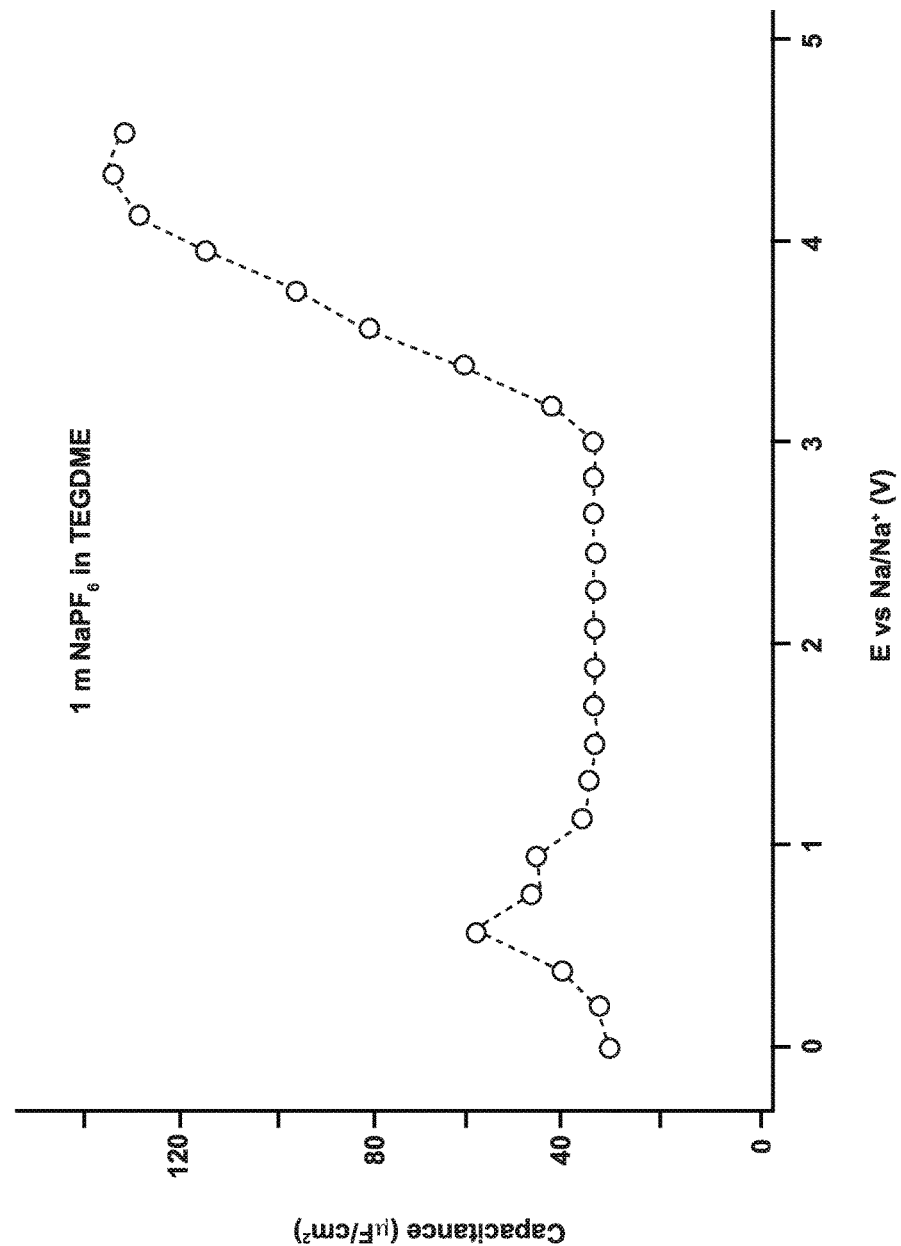

FIGS. 8B and 9B demonstrate that the stability of electrolyte compositions A and B over a 4 V and 4.5 V electrochemical voltage window, respectively, is not an artifact of electrode passivation. FIGS. 8B and 9B both show capacitance values greater than 15 $\mu F/cm^2$ across the entire voltage window, indicating that an insulating surface film is not being formed by electrolyte reduction or oxidation reactions under these conditions.

Figure 10A:
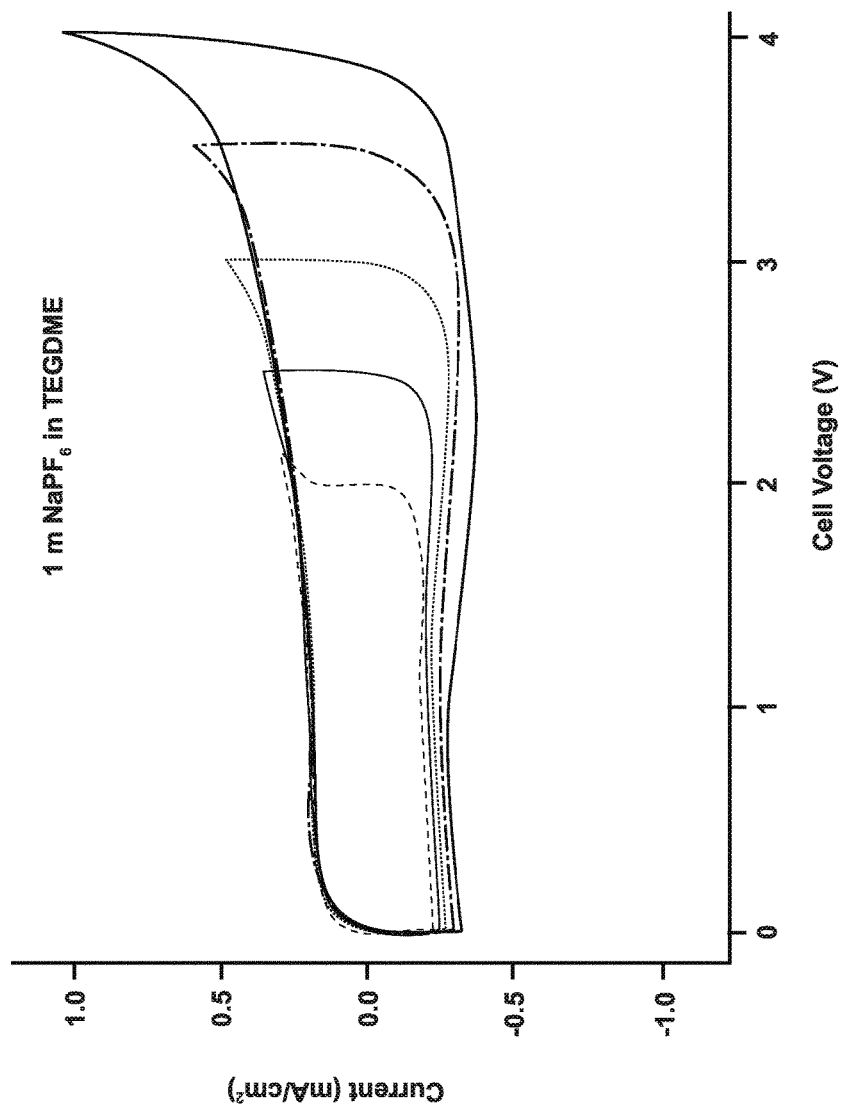
FIGS. 10A-B illustrate a cyclic voltammetry scan and a charge-discharge curve, respectively, for an electrolyte composition in accordance with an embodiment of the present invention.
Figure 10B:
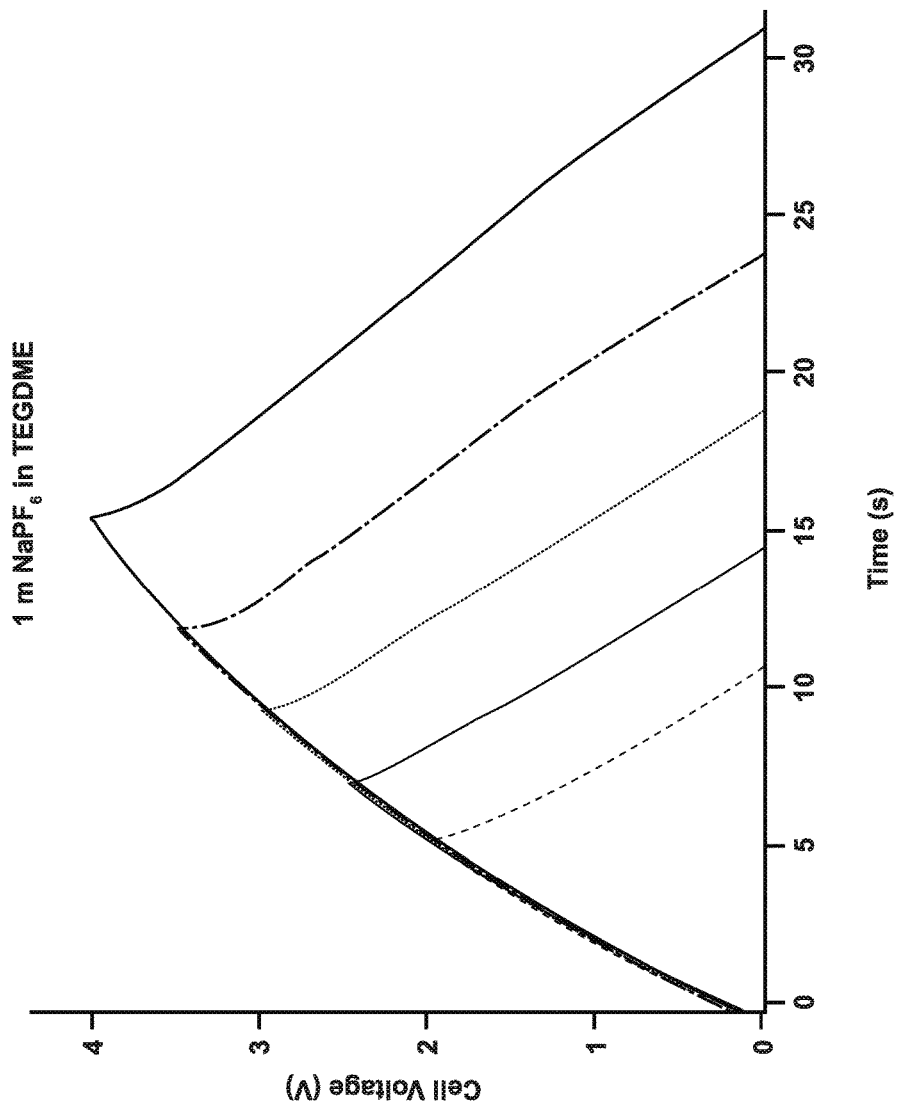

FIGS. 10A-B illustrate the results of electrolyte composition B in the pouch cell capacitor describe above which includes symmetric carbon black electrodes. FIG. 10A illustrates stable CV curves cycled progressively up to a total cell voltage of 4 V. The CV curves of FIG. 10A exhibit the typical rectangular response that would be expected for a double-layer capacitor. FIG. 10B illustrates stable galvanostatic charge-discharge profiles at progressive cut-off voltages up to 4 V which demonstrate the triangular shape expected for a capacitor. A small voltage drop at the charge-discharge transition is also seen due to ohmic resistance. The charge-discharge profiles of FIG. 10B also overlap during the charging process, indicative of stability of both the electrodes and the electrolytes up to at least 4 V.

Figure 11:
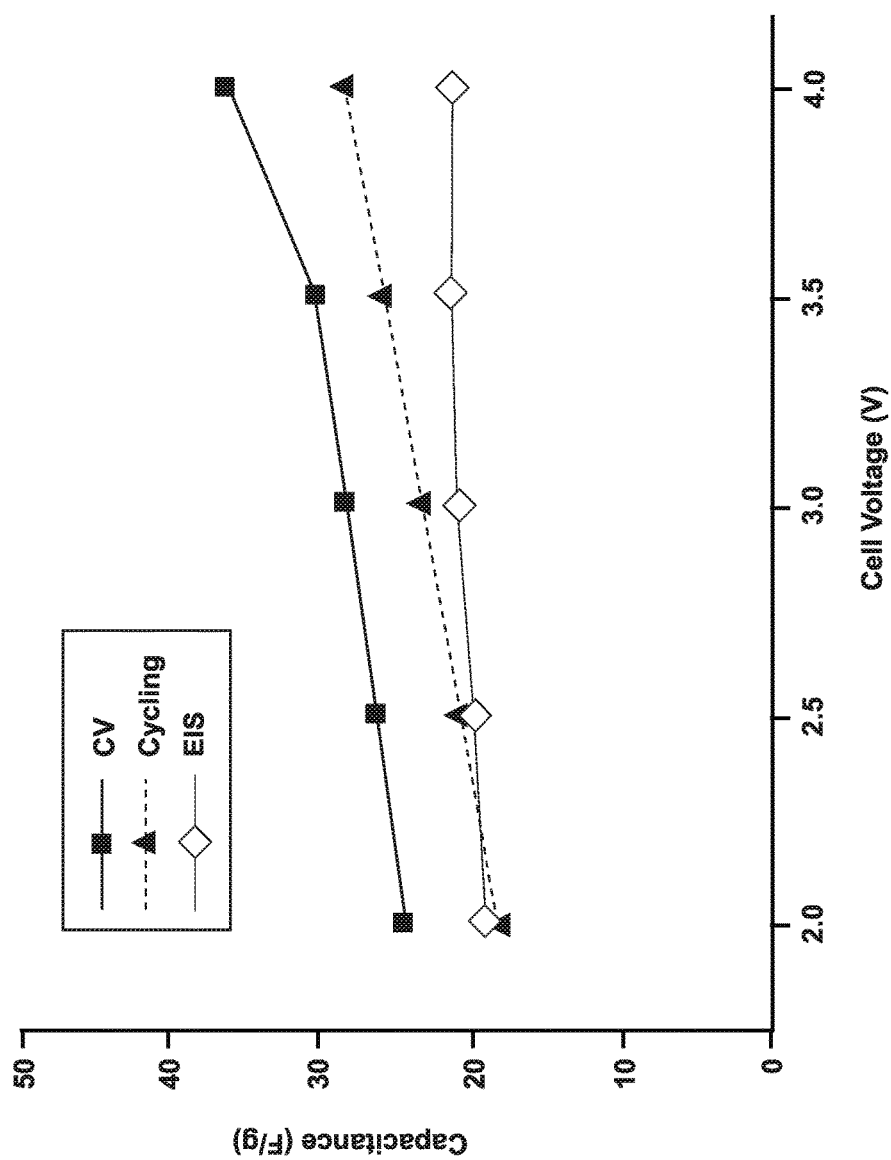
FIG. 11 is a graph that illustrates capacitance values extracted from cyclic voltammetry, EIS, and charge-discharge cycling for an electrolyte composition in accordance with an embodiment of the present invention.

Referring now to FIG. 11, the capacitance values measured according to CV, EIS, and charge-discharge cycles for electrolyte composition B ($NaPF_6$/TEGDME) used in the pouch cell capacitor describe above are shown. For the method of calculating capacitance using CV, the current at the midpoint of the operating voltage range was selected. For EIS, the capacitance was measured at OCV after CV cycling. For the charge-discharge cycling, the capacitance was calculated based on the discharge energy and voltage. As seen in FIG. 11, the capacitance determined using each of the three different methods shows reasonable agreement.

An increase in the electrochemical voltage window of the electrolyte composition can increase the energy density of the supercapacitor. Additional factors, such as electrolyte conductivity can also effect the operation of the supercapacitor. Increasing the conductivity of the electrolyte composition can decrease ohmic losses that can inhibit high power performance. Thus, in some cases, an electrolyte composition that increases the electrochemical voltage window can be further modified to increase the conductivity of the electrolyte composition. Table 3 below illustrates the conductivity and resistivity of the electrolyte compositions A-E.

TABLE 3

Conductivity and Resistivity Data*

| Electrolyte Composition | Conductivity (mS/cm) | Resistivity (ohm*cm) |
|---|---|---|
| A (NaOTf/TEGDME) | 1.3 | 800 |
| B (NaPF$_6$/TEGDME) | 1.9 | 535 |
| C (NaPF$_6$/DME) | 9.9 | 101 |
| D (NaOTf/TEGDME/DME) | 2.9 | 350 |
| E (NaPF$_6$/TEGDME/DME) | 6.5 | 153 |

*Conductivity and resistivity measured at room temperature.

While TEGDME provides good chemical stability, low toxicity, and a high flash point, the conductivity of the TEGDME-based electrolyte compositions A and B are an order of magnitude lower than more traditional acetonitrile-based electrolytes, which generally have a conductivity of greater than 50 mS/cm. The data in Table 3 demonstrates that blending TEGDME and DME can increase the conductivity of the composition compared to a similar composition in which the non-aqueous solvent component consists only of TEGDME. The conductivity of electrolyte composition C is 9.9 mS/cm, which is comparable to what can be achieved with the use of more traditional propylene carbonate electrolytes used in some commercial capacitors.

Figure 12:
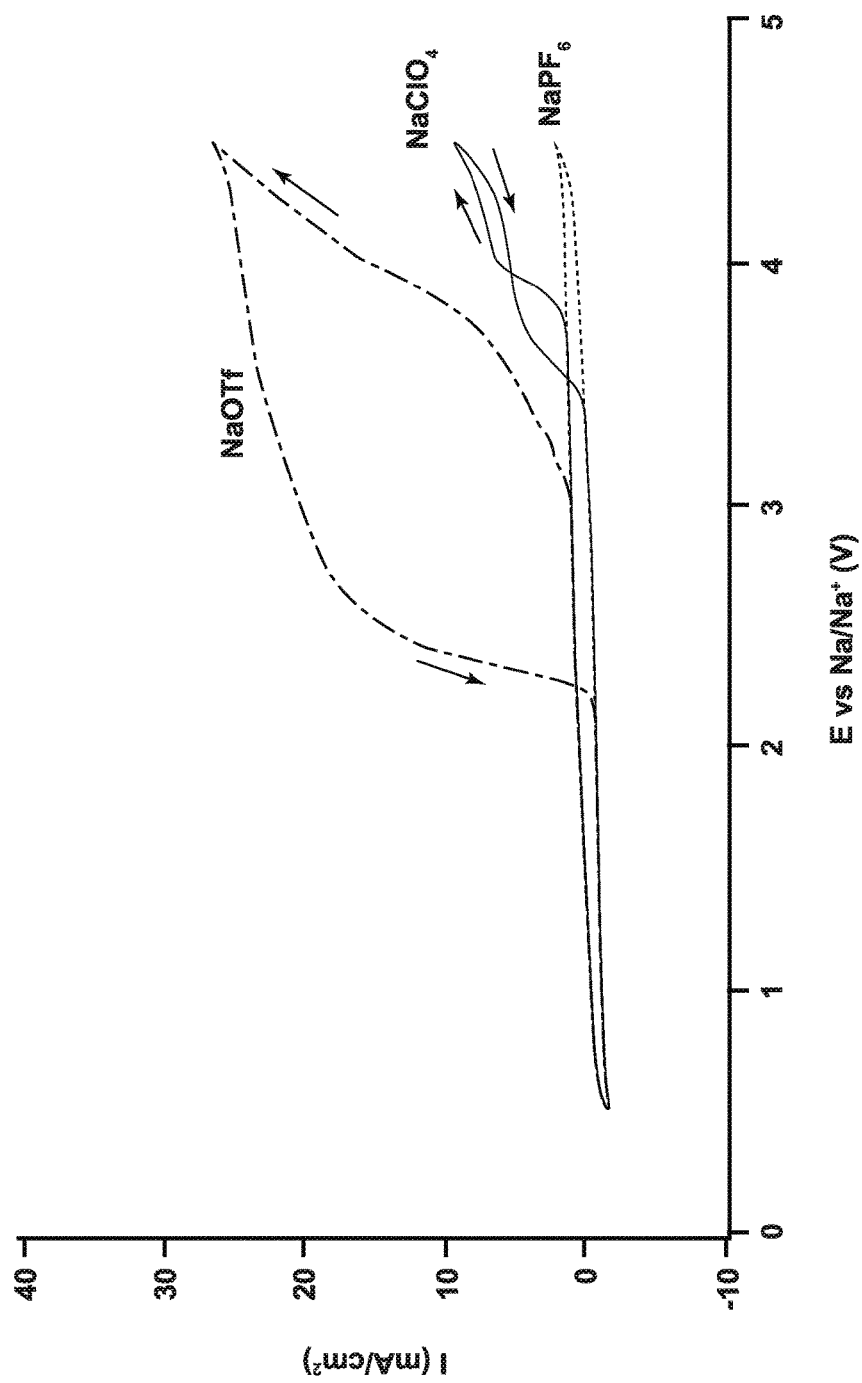
FIG. 12 is a graph that illustrates cyclic voltammetry scans for electrolyte compositions in accordance with an embodiment of the present invention.

Referring now to FIG. 12, CV traces of electrolyte compositions having different sodium salt components are illustrated. The increase in current seen when NaOTf is the salt component is indicative of corrosion of the aluminum electrode. The relatively flat traces for NaPF$_6$ are indicative of a stable passive film, which inhibits corrosion of the aluminum electrode. NaClO$_4$, while not as strong at inhibiting corrosion of the aluminum electrode as NaPF$_6$, still provides significant corrosion inhibition compared to NaOTf. NaPF$_6$ and/or NaClO$_4$ can be used alone or in combination with other salts, such as NaOTf for example, as corrosion inhibitors in supercapacitors utilizing the electrolyte compositions described herein. Additional examples of corrosion inhibitors include tetrabutylammonium perchlorate (TBAClO$_4$) and tetrabutylammonium hexafluorophosphate (TBAPF$_6$).

To reiterate, a conductive sodium salt component and a non-aqueous solvent component comprising tetraethylene glycol dimethyl ether (TEGDME), dimethoxyethane (DME), or combinations thereof can be combined to form an electrolyte composition that exhibits an electrochemical window greater than 4 volts.

As discussed above, electrolyte compositions including sodium based salts in linear polyether solvents such as TEGDME and DME (also referred to as glymes) can extend the operating voltage window of supercapacitors. TEGDME and DME do not passivate carbon-based electrodes at very negative potentials (near Na/Na+), and thus can potentially extend the practical voltage window of a supercapacitor by about 1.3 V compared to traditional electrolytes based on acetonitrile. While glymes typically do not have the high electrolytic conductivity of traditional acetonitrile-based electrolytes, TEGDME and DME can be more reductively stable and thus more likely to be suitable for use at higher voltages. Because the energy stored in a capacitor increases quadratically with voltage, extending the voltage window using the TEGDME and DME-based electrolyte compositions described herein can facilitate increasing the energy density of supercapacitors.

Additional components, such as corrosion inhibitors or components to increase electrolyte conductivity, can be added to the electrolyte compositions described herein as needed. For example, NaTFSI in particular can corrode the aluminum typically used as current collectors in supercapacitors and thus the addition of a corrosion inhibitor to a NaTFSI-based electrolyte composition can reduce corrosion of the current collector in these systems. Some sodium salts, such as NaPF$_6$, are also corrosion inhibitors and thus the DME or TEGMDE-based electrolyte compositions described herein utilizing NaPF$_6$ typically would not need an additional corrosion inhibitor. In another example, the conductivity of a TEGDME electrolyte composition can be increased by blending DME with TEGDME to provide an electrolyte composition having an increased voltage window and increased conductivity.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A supercapacitor comprising:
   a negative electrode having a current collector;
   a positive electrode having a current collector;
   an ion-permeable separator disposed between the negative and positive electrodes; and
   an electrolyte composition disposed between the negative and positive electrodes, the electrolyte composition comprising:
      a conductive sodium salt component comprising sodium bis(trifluoromethylsulfonyl)imide (NaTFSI); and
      a non-aqueous solvent component comprising dimethoxy ethane (DME);
   wherein the conductive sodium salt component and the non-aqueous solvent component are present at a molar ratio of NaTFSI:DME of 1:1 to 1:3, inclusive, and wherein the electrolyte composition has an electrochemical potential window of at least 3.25 volts.

2. The supercapacitor of claim 1 wherein the molar ratio of NaTFSI:DME is 1:2.

3. The supercapacitor of claim 1 wherein the electrolyte composition further comprises a corrosion inhibitor selected from the group consisting of sodium perchlorate (NaClO$_4$), tetrabutylammonium perchlorate (TBAClO$_4$), and combinations thereof.

4. The supercapacitor of claim 1 wherein the negative and positive electrodes comprise porous carbon.

5. The supercapacitor of claim 1 wherein the negative electrode current collector comprises aluminum.

6. The supercapacitor of claim 1 wherein the electrolyte composition has an electrochemical potential window of at least 3.25 volts with 99% coulombic efficiency after 10 cycles.

7. The supercapacitor of claim 1 wherein the conductive sodium salt component and the non-aqueous solvent component when mixed form a solvated ionic liquid.

8. An electrolyte composition for a supercapacitor comprising:
a conductive sodium salt component comprising sodium bis(trifluoromethylsulfonyl)imide (NaTFSI); and
a non-aqueous solvent component comprising dimethoxy ethane (DME);
wherein the conductive sodium salt component and the non-aqueous solvent component are combined at a molar ratio between one mole of NaTFSI to one mole of DME and one mole of NaTFSI to three moles DME, inclusive,
wherein the electrolyte composition has an electrochemical potential window of at least 3.25 volts.

9. The electrolyte composition of claim 8 further comprising a corrosion inhibitor selected from the group consisting of sodium perchlorate ($NaClO_4$), tetrabutylammonium perchlorate ($TBAClO_4$), and combinations thereof.

10. The electrolyte composition of claim 8 wherein the conductive sodium salt component and the non-aqueous solvent component when mixed form a solvated ionic liquid.

11. The electrolyte composition of claim 8 wherein the molar ratio of NaTFSI:DME is 1:2.

12. A method of forming an electrolyte composition for a supercapacitor comprising:
providing a conductive sodium salt component comprising sodium bis(trifluoromethylsulfonyl)imide (NaTFSI);
providing a non-aqueous solvent component comprising dimethoxy ethane (DME); and
combining the conductive sodium salt component and the non-aqueous solvent component to form an electrolyte composition comprising a solvated ionic liquid;
wherein the electrolyte composition has an electrochemical potential window of at least 3.25 volts and wherein the conductive sodium salt component and the non-aqueous solvent component are present at a molar ratio of NaTFSI:DME of 1:1 to 1:3, inclusive.

13. The method of claim 12 wherein the conductive sodium salt component and the non-aqueous solvent component are combined at a molar ratio of one mole of NaTFSI to two moles of DME.

14. The method of claim 12, further comprising providing a corrosion inhibitor selected from the group consisting of sodium perchlorate ($NaClO_4$), tetrabutylammonium perchlorate ($TBAClO_4$), and combinations thereof.

15. A method of forming a supercapacitor comprising:
providing a negative electrode having a current collector;
providing a positive electrode having a current collector;
providing an ion-permeable separator in a region between the negative and positive electrodes; and
providing an electrolyte composition in the space between the negative and positive electrodes, the electrolyte composition comprising:
a conductive sodium salt component comprising sodium bis(trifluoromethylsulfonyl)imide (NaTFSI); and
a non-aqueous solvent component comprising dimethoxy ethane (DME), the electrolyte composition having an electrochemical potential window of at least 3.25 volts;
wherein the non-aqueous solvent component and the at least one conductive sodium salt component are combined to form a solvated ionic liquid in the region between the negative and positive electrodes and wherein the conductive sodium salt component and the non-aqueous solvent component are present at a molar ratio of NaTFSI:DME of 1:1 to 1:3, inclusive.

16. The method of claim 15, further comprising providing a corrosion inhibitor selected from the group consisting of sodium perchlorate ($NaClO_4$), tetrabutylammonium perchlorate ($TBAClO_4$), and combinations thereof.

17. The method of claim 15 wherein the negative and positive electrodes comprise porous carbon.

18. The method of claim 15 wherein the negative electrode current collector comprises aluminum.

19. The method of claim 15 wherein the electrolyte composition has a 99% coulombic efficiency after 10 cycles.

* * * * *